No. 889,977. PATENTED JUNE 9, 1908.
J. H. SHAW.
LOCK.
APPLICATION FILED AUG. 13, 1906.
3 SHEETS—SHEET 1.
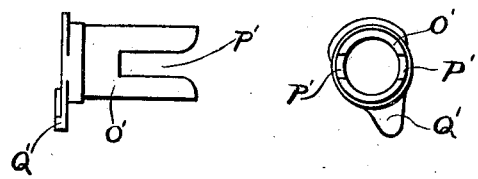
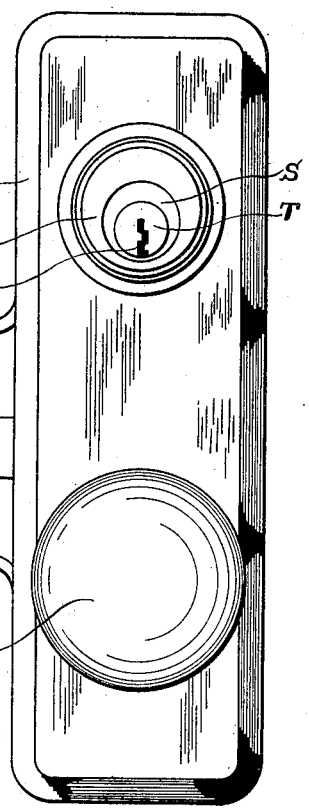
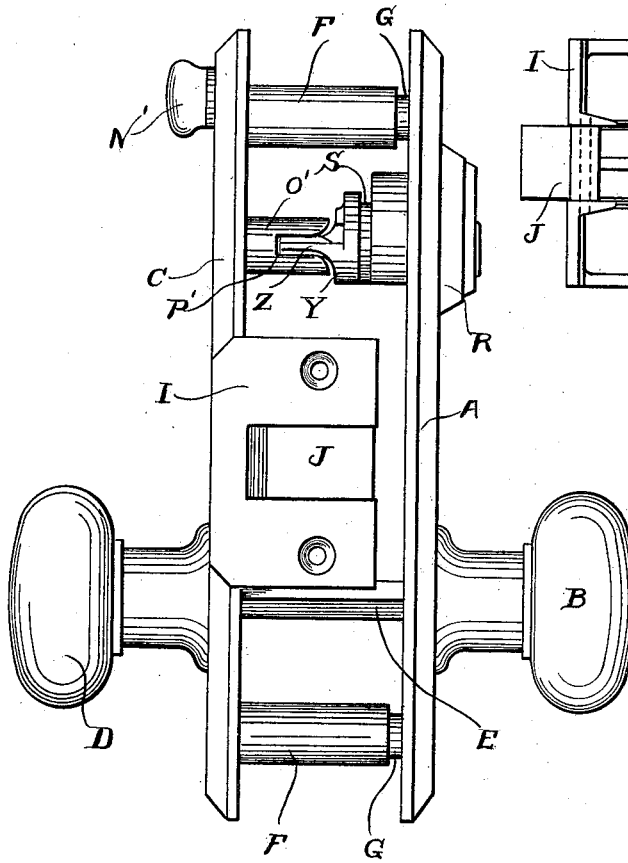
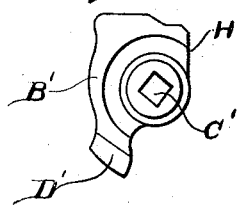
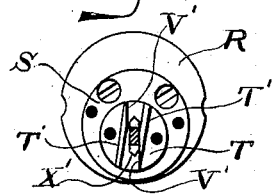

No. 889,977.

PATENTED JUNE 9, 1908.

J. H. SHAW.
LOCK.
APPLICATION FILED AUG. 13, 1906.

3 SHEETS—SHEET 2.

WITNESSES:
H. J. Foote
M. Olive Williams

INVENTOR.
John H. Shaw
BY Beach & Fisher
ATTORNEYS.

No. 889,977. PATENTED JUNE 9, 1908.
J. H. SHAW.
LOCK.
APPLICATION FILED AUG. 13, 1906.
3 SHEETS—SHEET 3.
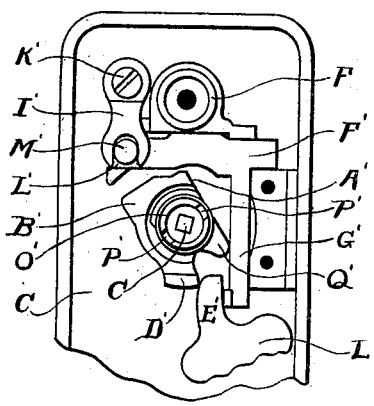
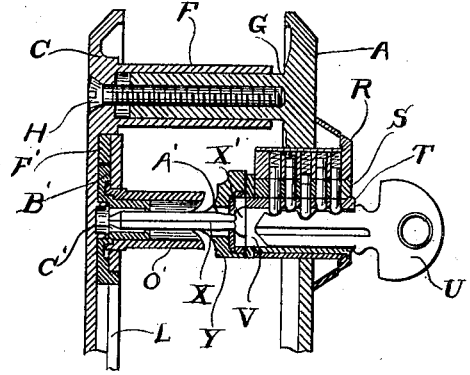
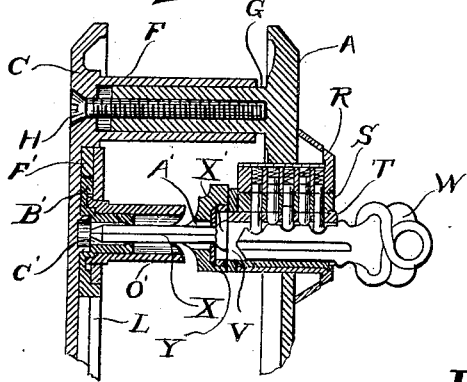
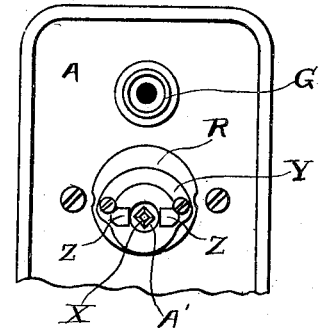
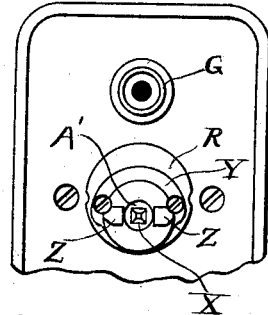
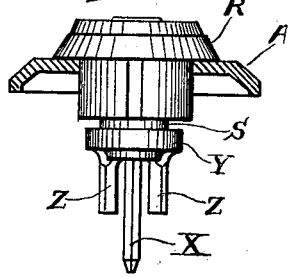
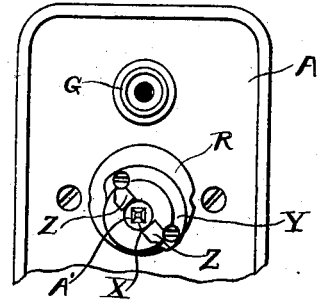
WITNESSES:
H. J. Foote.
M. Olive Williams.
INVENTOR
John H. Shaw
BY Beach & Fisher,
ATTORNEYS.
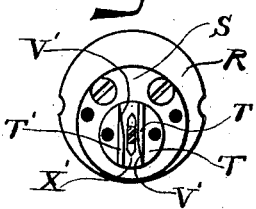

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK.

No. 889,977.  Specification of Letters Patent.  Patented June 9, 1908.

Application filed August 13, 1906. Serial No. 330,391.

*To all whom it may concern:*

Be it known that I, JOHN H. SHAW, of the city and county of New Haven and State of Connecticut, have invented new and useful Improvements in Locks, of which the following is a full, clear, and exact description, when taken in connection with the accompanying drawings.

This invention relates to locks, and more particularly to the connection between a so-called cylinder or Yale lock, and the latch bolt of the ordinary lock.

The object of the invention is the production of a lock in which the latch bolt may be locked in its protracted position from one side of the lock against operation by means of one key in the cylinder or Yale lock on the other side of the lock, and may also be retracted by an emergency or special key in the cylinder lock. To this end, the cylinder lock is provided with a hub or barrel and surrounding sleeve so constructed that the hub may be rotated separately by one key and with the sleeve by another key, and the invention consists of the provision of a locking device for preventing the retraction of the latch bolt when the hub of the cylinder lock is rotated separately, and the provision of means capable of being operated by the sleeve of the cylinder lock for releasing said locking device, so that the latch bolt may be retracted by means of the hub, together with such other improvements and combinations of parts, as are set forth and claimed hereinafter.

Figure 3:
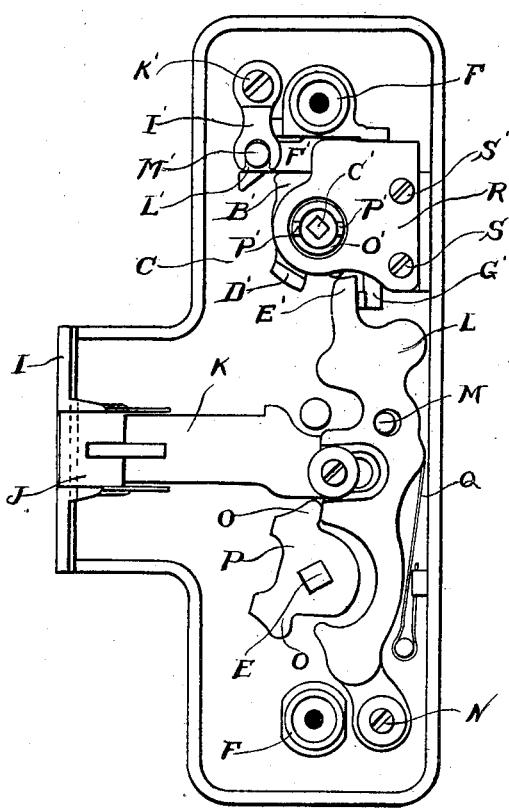
Figure 4:
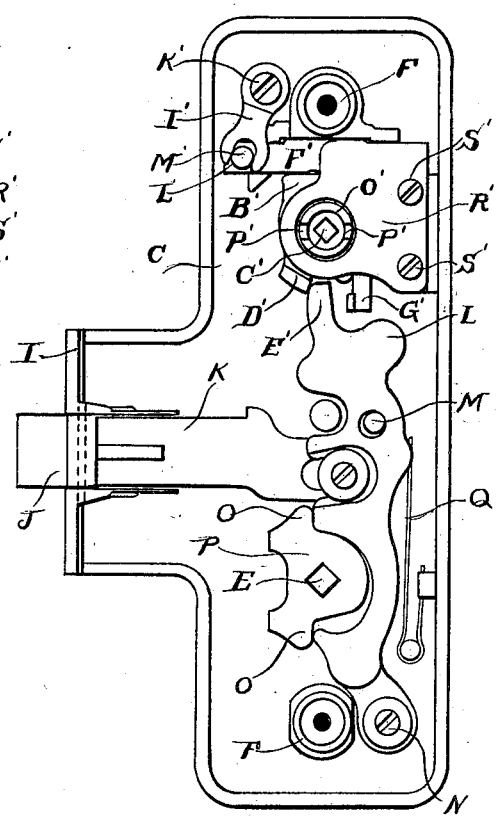
Figure 5:
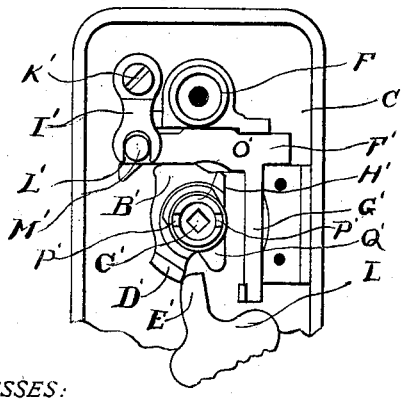
Figure 6:
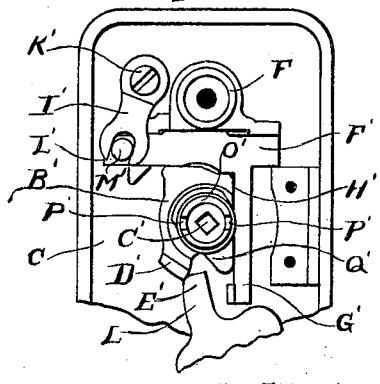

Referring to the drawings, Figure 1 represents a side elevation of a lock embodying the invention, showing the outside escutcheon plate, Fig. 2, a front elevation of said lock, Fig. 3, an inside view of the inner escutcheon plate, containing the principal operating parts (the latch bolt being shown retracted), Fig. 4, a similar view, with the latch bolt shown protracted, and the locking mechanism for checking the retraction of the latch bolt shown in operative position, Figs. 5, 6 and 7, similar views of the upper end of the lock, with one of the retaining plates removed, the parts being shown in various positions, Figs. 8 and 9, detailed side and plan views, respectively, of the releasing device, Fig. 10, a plan view of the latch operating block, Figs. 11 and 12, central transverse sections through the upper end of the lock, showing the tumblers of the cylinder lock in the different positions produced by different keys, Figs. 13, 14 and 15, views of the inner end of the cylinder lock and associated parts in different positions, Fig. 16, a top view of the same, and Figs. 17 and 18, end views of the casing, barrel and sleeve of the cylinder lock in different positions.

In all figures, similar letters of reference represent like parts.

As shown in the drawings, the parts designated by the letter A represent the escutcheon plate on the outside of the door, and B the outside knob.

C designates the escutcheon plate on the inside of the door, and D the inside knob. The knobs are mounted on a spindle E in any well known manner, and the two escutcheon plates A and C are placed in proper alinement with each other by means of telescoping parts F and G, and are secured by a screw or screws H projecting from the inside escutcheon plate C and engaging the part G on the outer escutcheon plate A.

In the face plate I of the lock is pivoted the latch bolt J, which is retracted by means of a sliding plate K in the escutcheon C, to which is pivotally connected a latch lever L, by means of the stud M. The latch operating lever L is pivoted at N to the escutcheon, and is adapted to be engaged by the wings O of a hub P rigidly secured to the spindle E, so that the turning of the spindle E will swing the latch lever L on its pivot and retract the latch bolt J, by means of the plate K (Fig. 3). A spring Q tends to hold the latch lever L, sliding plate K and latch bolt J in their protracted positions, shown in Fig. 4.

A cylinder lock R is mounted on the outer escutcheon plate A, and is provided with a sleeve S loosely mounted therein, having an eccentric bore for a barrel or hub T. Within the cylinder R, sleeve S, and hub T are suitable tumbler mechanisms for permitting the rotation of the hub or barrel T alone, as indicated in Fig. 11, or the barrel or hub T and sleeve S conjointly, as indicated in Fig. 12. As this construction is substantially the same, as shown in a former application made by me for Letters Patent of the United States, filed July 21st, 1905, Serial No. 270,691, a detailed description is herein omitted.

The insertion of the key U in the slot V in the barrel or hub T places the tumblers in such position, as shown in Fig. 11, that the turning of the key U will rotate the hub or barrel T alone, while the insertion of the key W places the tumblers in such position, as shown in Fig. 12, that the turning of the key W will rotate the hub or barrel T and sleeve S conjointly. On the inner end of the barrel T is secured a spindle X, so that it will rotate therewith.

The inner end of the barrel T is provided with two parallel projections T' which are slightly cut away as shown at V' (Figs. 17 and 18), so that there is a slight slackway for the flattened end X' of the spindle X. As shown in Figs. 17 and 18, the barrel is capable of a limited rotary movement without rotating the spindle X, while continued rotation of the barrel T carries the spindle X with it.

On the inner end of the sleeve S is rigidly secured a plate Y, carrying two posts Z on either side of the spindle X. The plate Y is provided with a perforation A', through which spindle X may project, and in which it is free to rotate. By this means, when the barrel T is rotated alone, the spindle X is rotated on its axis, as shown more particularly in Fig. 14, but when the barrel T and sleeve S are rotated together, the posts Z are turned on the axis of the sleeve S and the spindle X is turned also, as shown more particularly in Fig. 15.

Mounted on the inner escutcheon C is a latch operating block B', which is provided with an axial perforation C' corresponding to the transverse section of the spindle X, but shown slightly wider than the spindle X in order that the spindle may be capable of a limited lateral play in the perforation C'. The latch operating block B' is provided with a bit D', adapted upon the rotation of the block B' to engage the extreme end E' of the latch operating lever L, as shown more particularly in Figs. 4, 5, 6, and 7, so that the rotation of the latch operating block B' by the spindle X of the cylinder lock will swing the latch operating lever on its pivot to retract the latch bolt J. A sliding catch F' on the escutcheon C is adapted when in the position shown in Figs. 4 and 6, to prevent the rotation of the latch operating block B' by engaging with a depending arm G' the straight edge H' of the block B'. When the sliding catch F' is in the position, however, shown in Figs. 3, 5 and 7, the block B' is free to turn on its pivot. The catch F' is operated by means of a lever I', mounted on a shaft K', and having at its free end a slot L' adapted to receive a stud M' on the catch F'. The shaft K' projects through the escutcheon C, and is provided with a thumb-piece N' on the outside of the escutcheon, so that by turning the thumb-piece N' the block B may be locked or released, and the spindle X correspondingly prevented from retracting the latch bolt or permitted to retract it. Mounted on the block B' is a cylindrical piece O', having a longitudinal slot P', adapted to receive the posts Z secured to the sleeve S of the cylinder lock R. The piece O' is provided with a laterally projecting dog Q', which upon the rotation of the piece O' is adapted to engage the depending arm G' of the sliding catch F', and force it away from the straight edge H' of the block B'. (See Figs. 6 and 7.) A plate R' secured to the escutcheon C by screws S', or other suitable means, holds the sliding catch F', the block B', and the cylindrical piece O' in place.

The operation of the lock is as follows: The latch bolt J may be retracted by the hub O of the spindle E, as above set forth. When it is desired to lock the latch bolt against retraction by the key of the cylinder lock, the thumb-piece N' is turned so that the sliding catch F' is brought into the position shown in Figs. 4 and 6, wherein as above described the depending arm G' of the catch F' prevents the rotation of the latch operating block B' by means of the spindle X. Consequently, when a key, such as U, is inserted which rotates merely the hub or barrel T of the cylinder lock, the latch bolt cannot be retracted until the sliding catch F' is released from engagement with the block B'. This release may be accomplished from the inside of the door by turning the thumb-piece N'. When the catch F' is in its operative position, the latch bolt can only be retracted from the cylinder lock by the insertion of a key, such as W, which is adapted to rotate the sleeve S with the hub or barrel T of the cylinder lock, because when the sleeve S is rotated, the posts Z are turned on the axis of the sleeve S to the position shown in Fig. 15, and they in turn will turn the cylindrical piece O' to the position shown in Fig. 7, wherein the dog Q' will engage the depending arm G' of the sliding catch F' and force the catch F' away from the block B'. During the movement of the barrel and sleeve, the spindle X is not rotated, because of the limited slack-way in the connection between the barrel T and spindle X, so that the sleeve is rotated sufficiently to move the sliding catch F' away from the block B', before the spindle X is rotated by the further rotation of the barrel T to turn the block B' to operate the latch operating lever L, as shown more particularly in Fig. 7.

By this construction, one key or set of keys may be provided for the cylinder lock against which the occupant of the room or house may lock the latch bolt, while another key may be provided, which, in case of emergency, may operate the latch bolt even when the sliding catch F' has been moved from the inside of the lock to its locked or operative position.

Having now described my invention, what

I claim and desire to secure by Letters Patent, is:—

1. In a lock, the combination with a movable bolt; of the casing of a cylinder lock; a rotary key barrel; a sleeve loosely mounted in said casing on said barrel; tumbler mechanism in said casing, sleeve and barrel for locking said sleeve and barrel to rotate together or separately; a connection between said barrel and bolt for retracting said bolt upon the rotation of said barrel; a device for locking said barrel against rotation; and mechanism operated by said sleeve for releasing said locking device, substantially as described.

2. In a lock, the combination with a movable bolt; of the casing of a cylinder lock; a rotary key barrel; a sleeve loosely mounted in said casing on said barrel; tumbler mechanism in said casing, sleeve and barrel for locking said sleeve and barrel to rotate together or separately; a lever for retracting said bolt; means for operating said lever upon the rotation of said barrel; a device for locking said lever against rotation; and mechanism operated by said sleeve for releasing said locking device, substantially as described.

3. In a lock, the combination with a movable bolt; of the casing of a cylinder lock; a rotary key barrel; a sleeve loosely mounted in said casing on said barrel; tumbler mechanism in said casing, sleeve and barrel for locking said sleeve and barrel to rotate together or separately; a connection between said barrel and bolt for retracting said bolt upon the rotation of said barrel; a sliding catch for locking said barrel against rotation; and mechanism operated by said sleeve for releasing said sliding catch, substantially as described.

4. In a cylinder lock, the combination with the casing; of a rotary key barrel; a sleeve loosely mounted in said casing on said barrel; a member rotated by said barrel and capable of a limited rotary movement independent of said barrel; and tumbler mechanism in said casing, sleeve and barrel for locking said sleeve and barrel to rotate together or separately, substantially as described.

5. In a cylinder lock, the combination with the casing; of a rotary key barrel; a sleeve loosely mounted in said casing on said barrel; a spindle secured to said barrel to rotate therewith, and capable of a limited rotary movement independent of said barrel; and tumbler mechanism in said casing, sleeve and barrel for locking said sleeve and barrel to rotate together or separately, substantially as described.

6. In a lock, the combination with a movable bolt; of a casing of a cylinder lock; a rotary key barrel; a sleeve loosely mounted in said casing on said barrel; tumbler mechanism in said casing, sleeve and barrel for locking said sleeve and barrel to rotate together or separately; a rotary member for retracting said bolt; a connecting member between said barrel and rotary member for retracting said bolt, said connecting member being rotatable by said barrel, but being capable of a limited independent rotation; a sliding catch for locking said rotary member against rotation; and mechanism operated by said sleeve for releasing said sliding catch, substantially as described.

7. In a lock, the combination with a movable bolt; of means for deadlocking the bolt in its protracted position; a cylindrical lock having a rotary key barrel and a sleeve loosely mounted on said barrel and tumbler mechanism in said cylinder lock for locking said sleeve and barrel to rotate together or separately; means for retracting said bolt operable by said barrel but capable of a limited movement independent thereof, said deadlocking means being released upon the rotation of said sleeve, substantially as described.

In witness whereof, I have hereunto set my hand on the 3rd day of August, 1906.

JOHN H. SHAW.

Witnesses:
L. J. KIRKHAM,
A. M. RYAN.